May 15, 1956     M. P. D'ERRICO     2,745,704

SEALING MEANS FOR PISTONS

Filed May 18, 1953

INVENTOR.
MARTIN P. D'ERRICO
BY Lyon & Lyon
ATTORNEYS

United States Patent Office 2,745,704
Patented May 15, 1956

2,745,704

SEALING MEANS FOR PISTONS

Martin P. D'Errico, Altadena, Calif.

Application May 18, 1953, Serial No. 355,790

5 Claims. (Cl. 309—31)

This invention relates to the use of piston rings and specifically to means for preventing leakage of air or other pressure fluid past the inner side of the ring.

A purpose of the invention is to afford a leak-tight seal between the edges and inner faces of a metallic piston ring and the corresponding faces of the ring groove in which it is mounted.

A purpose of the invention is to provide a seal which increases in tightness as the retained pressure increases and which will remain tight when piston movement ceases without relief of the pressure.

A purpose of the invention is to provide a seal between two relatively-moving, concentric cylindrical surfaces which has the durability and service life of metallic piston rings together with a resistance to leakage equal to that displayed by rubber or other soft packings.

A further purpose is to provide a sealing means for pistons which is particularly applicable to the arrangement shown in a copending application of Delahay, Serial No. 355,490, filed May 18, 1953.

With the above and other objects in view as may appear hereinafter, reference is directed to the accompanying drawings in which.

As indicated hereinbefore, this invention is intended primarily to serve as a seal between a cylinder and a piston which moves therein at relatively low velocities and against high pressures. For the purposes of illustrating this invention, a piston 1 is shown within a cylinder 2. The piston is provided with a ring groove 3 adjacent its working end.

Figure 1:
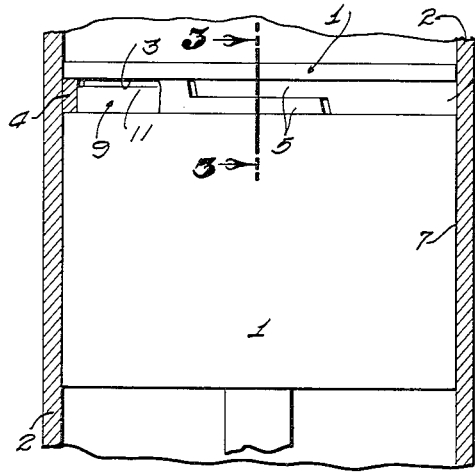
Figure 1 is a substantially diagrammatical view of a piston shown within a cylinder and indicating one form of metallic sealing ring employed in conjunction with this invention.
Figure 2:
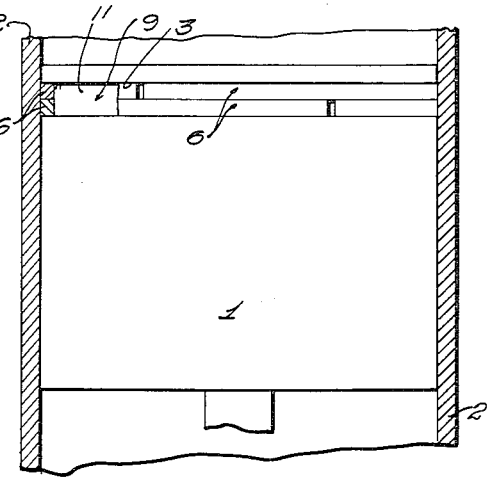
Figure 2 is a similar diagrammatical view illustrating another metallic sealing ring arrangement.

Fitted within the ring groove is a metallic outer ring 4 which may be provided with the conventional step 5 as shown in Figure 1. Alternatively a pair of metallic outer rings 6 may be employed as shown in Figure 2. In fact, various types of conventional metallic seal rings may be employed.

A clearance annulus indicated by 7 is provided between the piston 1 and the cylinder 2. This annulus compensates for relative expansion and contraction of the piston and cylinder and also permits the formation of a lubrication film. It is necessary for radial movement of the metallic outer ring 4 or 6 that there be a clearance indicated by 8 between the sealing ring and the axial walls of the groove 3. During the working stroke of the piston the clearance space 8 is located at the top side of the ring or rings as viewed in Figure 3, whereas during the return stroke of the piston clearance space 8 is located at the bottom of the ring or rings.

The construction so far described may be considered as conventional and serves quite admirably under conditions where the piston reciprocates continuously and the slight loss of fluid past the ring or rings is not a serious matter. In the exercise of the present invention it is desirable to prevent as far as possible all loss of pressure fluid past the piston, even at slow piston speeds or when the piston is stationary. This loss occurs by reason of the flow around the backside of the piston rings and is due also to leakage through the gap which necessarily exists between the extremities of the seal ring.

To overcome this difficulty the ring groove 3 is made sufficiently deeper than the radial width of the outer seal ring 4 or 6 to accommodate an endless deformable inner ring 9. This ring is formed of rubber or rubber-like material such as polymerized chloroprene (Neoprene) or polysulfid rubber (Thiokol). Also such material as teflon or polyethylene may be employed to meet the various conditions of service.

The deformable inner ring 9 is U-shaped in cross-section to form a radially inner flange or lip 10, a radially outer flange or lip 11, and a connecting cross web 12. The inner ring 9 is set within the ring groove 3 behind the outer ring 4 or 6 and with the lips 10 and 11 directed toward the working end of the piston. The normal width of the inner ring is preferably slightly greater than the radial space between the outer ring and the confronting wall of the ring groove 3 so that the inner ring crowds outwardly against the outer ring. The extremity of the radially outer lip 11 of the inner ring is provided with a bevel 13 and tends to press against the radially inner surface of the outer ring.

Figures 3, 4:
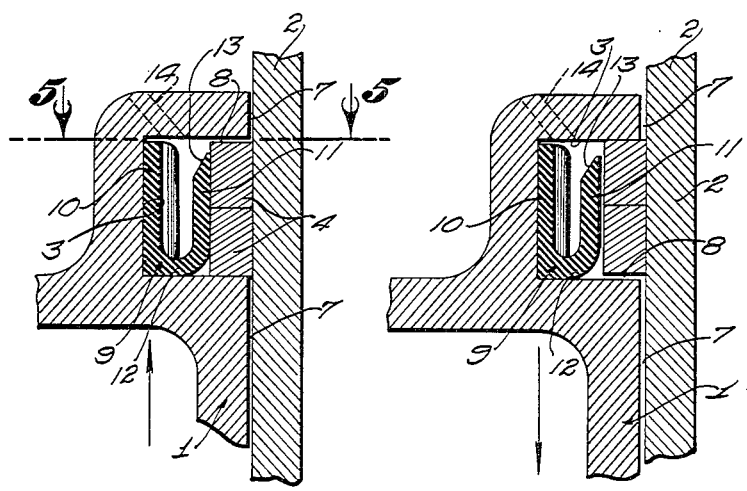
Figure 3 is an enlarged fragmentary sectional view through 3—3 of Figure 1 showing the arrangement of the sealing means during the working stroke of the piston.
Figure 4 is a similar enlarged fragmentary sectional view showing the sealing means in a condition assumed during the return stroke of the piston.
Figure 5:
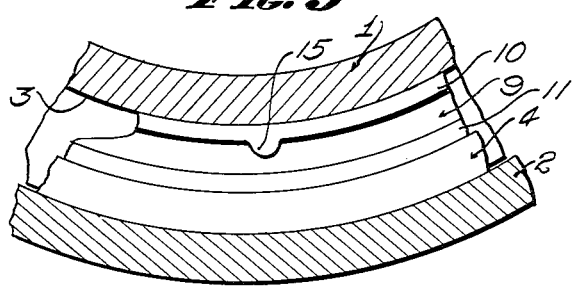
Figure 5 is a fragmentary sectional view through 5—5 of Figure 3.

During the working stroke of the piston or under conditions in which the piston is static and a pressure exists at the working side of the piston, the inner ring occupies the position shown in Figure 3, that is the fluid pressure within the inner ring forces the radially outer lip 11 in tight sealing contact with the outer rings 4 and also forces the radially inner lip 10 and cross web 12 in tight sealing contact with the corresponding walls of the ring groove 3.

It should be observed that the confronting surfaces of the step portions 5 of the ring 4, as well as the confronting surfaces of the double ring 6 form a tight fluid seal. This is also true of the radially outer surface of the rings 4 or 6 and the confronting wall of the cylinder 2. As a consequence, virtually no loss of fluid pressure occurs past the sealing means comprising the inner and outer rings. In fact, such excellent sealing condition is obtainable that a high pressure zone may be maintained at the working end of the piston for long periods of time without noticeable loss of pressure. On the other hand, the metallic outer ring or rings are excellently suited for withstanding the wear occasioned by repeated movement of the piston.

During the return stroke of the piston the outer sealing ring or rings tend to occupy the portion shown in Figure 4, in which case a lubricant entrapped in the annulus 7 is deflected through the clearance space 8 and exerts sufficient pressure to compress the inner ring radially so as to flow into the cavity defined by the inner ring 9 and the groove 3. Normally this flow will cease when the pressures reach equilibrium. However, in some instances it is desirable to bleed off this pressure by means of a port or ports 14 as indicated by dotted lines in Figures 3 and 4.

Under some conditions the outer lip 11 of the inner ring 9 may be forced tightly against the inner lip 10. Normally the lip 11 will spring back to position once the condition is relieved; however, if the two lips seal together throughout the circumference of the ring 9 they may tend to remain sealed together. This is prevented by providing vertical ribs 15 at several points on the radially outer side of the lip 10. Three or four such ribs will suffice. However, more may be provided if desired.

It should be observed that while the sealing means comprising the inner and outer rings are shown at one end only of the piston, that in the event of use in conjunction with a double acting piston to such seal, means may be provided and positioned so that the final side of the deformable inner ring faces in opposite directions.

Having fully described my invention, it is to be understood that I do not wish to be limited to the details herein set forth, but my invention is of the full scope of the appended claims.

I claim:

1. A combined lubricant pumping and sealing means for a piston adapted to be reciprocated in a lubricant coated cylinder and having a piston ring groove formed in its circumferential surface; a metallic piston ring occupying the radially outer portion of said groove; a bypass including at least the radially inner portion of said groove, and having an inlet end communicating with the annular region between said piston and cylinder at the low pressure side of said piston ring and an outlet communicating with the high pressure side of said piston; and a unitary continuous ring of resilient material interposed in said bypass between said piston ring and the bottom of said groove, the cross-section of said resilient ring being three sides of a hollow rectangle open at one end and with the open end directed toward the high pressure end of said piston, whereby fluid pressure may enter said ring to expand the same into non-leaking contact with the inner face of said piston ring and with the bottom and one end wall of said groove, to seal against the escape of pressure from the high pressure end of said piston to the low pressure end thereof, said resilient ring being radially collapsible to permit the pumping past said metallic piston ring of at least a portion of the lubricant coating entrapped between said piston and cylinder, when the pressure of said lubricant coating exceeds the pressure at the high pressure end of said piston.

2. The combination with a piston and cylinder having confronting walls and a groove in one of said walls, said walls defining a clearance space in which lubricant is entrapped, of a combined lubricant pumping and sealing means, comprising: at least one split metallic ring set in the radially outer portion of said groove and tending to sealingly engage the other of said confronting walls, said metallic ring being axially displaceable in said groove to form with either axial side thereof a clearance passage; a bypass including the radially inner portion of said groove and said clearance passage and having an inlet end communicating with said clearance space at the low pressure side of said metallic ring and an outlet communicating with the high pressure side of said piston; and a resilient seal ring of substantially U-shaped cross-section within said groove behind said metallic ring defining axially directed lips and a connecting web, one of said lips yieldably engaging said metal ring to close said bypass when said metal ring is in one axial position with respect to said groove, to seal against the escape of pressure from the high pressure end of said piston to the low pressure end thereof, said resilient ring being radially collapsible to permit the pumping through said bypass around said metallic piston ring of at least a portion of the lubricant coating entrapped between said piston and cylinder, when the pressure of said lubricant coating exceeds the pressure at the high pressure end of said piston.

3. The combination with a piston and cylinder having confronting walls and a groove in one of said walls, said walls defining a clearance space in which lubricant is entrapped, of a combined lubricant pumping and sealing means, comprising: at least one split metallic ring set in the radially outer portion of said groove and tending to sealingly engage the other of said confronting walls, said metallic ring being axially displaceable in said groove to form with either axial side thereof a clearance passage; a bypass including the radially inner portion of said groove and said clearance passage and having an inlet end communicating with said clearance space at the low pressure side of said metallic ring and an outlet communicating with the high pressure side of said piston; and a resilient seal ring of substantially U-shaped cross-section disposed within said groove and defining axially directed yieldable radially inner and radially outer lips, the radially outer lip sealingly engaging said metallic ring to close said bypass when said metal ring is in one axial position relative to said groove, to seal against the escape of pressure from the high pressure end of said piston to the low pressure end thereof, said resilient ring being radially collapsible to permit the pumping through said bypass around said metallic piston ring of at least a portion of the lubricant coating entrapped between said piston and cylinder, when the pressure of said lubricant coating exceeds the pressure at the high pressure end of said piston; at least one of said lips having on its side confronting the other lip vertical ribs to prevent mutual sealing engagement of said lips.

4. The combination with a piston and cylinder having confronting walls and a groove in one of said walls, said walls defining a clearance space in which lubricant is entrapped, of a combined lubricant pumping and sealing means, comprising: at least one split metallic ring radially movable in said groove and sealingly engaging the confronting walls, there being a lubricant bypass including the portion of said groove back of said metallic ring and having an inlet end communicating with said clearance space at one axial side of said metallic ring and an outlet communicating with the end of said piston beyond the other axial side of said metallic ring; and a resilient seal ring of substantially U-shaped cross-section defining axially directed radially inner and radially outer lips and a connecting web, said seal ring being positioned in said groove behind said metallic ring and yieldably engageable with said metallic ring and the walls of said groove, to permit flow of lubricant in one direction through said bypass and prevent flow in the opposite direction.

5. The combination with a piston and cylinder having confronting walls and a groove in one of said walls, said walls defining a clearance space in which lubricant is entrapped, of a combined lubricant pumping and sealing means, comprising: at least one split metallic ring radially movable in said groove and sealingly engaging the confronting walls, there being a lubricant bypass including the portion of said groove back of said metallic ring and having an inlet end communicating with said clearance space at one axial side of said metallic ring and an outlet communicating with the end of said piston beyond the other axial side of said metallic ring; a resilient seal ring of substantially U-shaped cross-section defining axially directed radially inner and radially outer lips and a connecting web, said seal ring being positioned in said groove behind said metallic ring and yieldably engageable with said metallic ring and the walls of said groove, to permit flow of lubricant in one direction through said bypass and prevent flow in the opposite direction; and means interposed between said lips to prevent mutual sealing engagement.

References Cited in the file of this patent

UNITED STATES PATENTS

| | | |
|---|---|---|
| 1,983,523 | Crowell | Dec. 11, 1934 |
| 2,127,290 | Farina | Aug. 16, 1938 |
| 2,240,780 | Hunter | May 6, 1941 |
| 2,607,644 | Smith | Aug. 19, 1952 |